United States Patent
Goldstein

[11] Patent Number: 5,850,064
[45] Date of Patent: Dec. 15, 1998

[54] METHOD FOR PHOTOLYTIC LIQUID PHASE SYNTHESIS OF SILICON AND GERMANIUM NANOCRYSTALLINE MATERIALS

[75] Inventor: Avery Nathan Goldstein, Oak Park, Mich.

[73] Assignee: Starfire Electronics Development & Marketing, Ltd., Bloomfield Hills, Mich.

[21] Appl. No.: 840,301

[22] Filed: Apr. 11, 1997

[51] Int. Cl.$^6$ ............... C01B 53/00; C22B 41/00; C22B 25/00; C21B 15/00
[52] U.S. Cl. ............... 204/157.4; 204/157.41; 75/689; 75/690; 75/711; 75/362
[58] Field of Search ............... 204/157.4, 157.41; 75/10.13, 689, 690, 711, 362

[56] References Cited

U.S. PATENT DOCUMENTS

| | | | |
|---|---|---|---|
| 2,927,052 | 3/1960 | Moudry | 204/157.4 |
| 3,167,525 | 1/1965 | Thomas | 260/41 |
| 5,064,517 | 11/1991 | Shimo | 204/157.41 |

OTHER PUBLICATIONS

Littau et al., A luminscent Silicon Nanocrystal Colloid via a High–Temperature Aerosol Reaction, J. Phys. Chem. 1993, 97, 1224–1230 (no month available).

Bleyand Kauzlarich, A low Temperature Solution Phase Route for the Synthesis of Silicon Nanocrystals, J. Am. chem. Soc. 1996, 118, 12461–12462 *no month available.

Brus, Capped Nanometer Silicon electronic Materials, Adv. Matls. 1993, 5(4) 286–288 *no month available.

Pola et al., ARF laser photolysis of tetra–ethyl and tetravinyl–silane, J. Orgmet. Chem. 1995, 489, C9–C11 *no month available.

Iijima, Fine Particles of Silicon. II., Jap. J. of Appl. Phys. Mar. 1987, 26, 365–372.

Chui et al., Gas Phase Synthesis of Processing of Silicon Nanocrystallites: Characterization by Photoluminescence Emission Spectroscopy, J. Electr. Matls, 1994, 23(3), 347–351 *no month available.

Buss and Babu, Synthesis of silicon nitride particles in pulsed radio frequency plasmas, J. Vac. Sci. Technol. A, Mar./Apr. 1996, 14(2), 577–581.

Heath, A Liquid Solution Phase synthesis of Crystalline Silicon, Science Nov. 1992, 256, 1131–1133.

Lipinski and Le Goues, Chemical Preparation of Crystalline Nanoclusters, Chem. Mater. 1991, 3, 989–992 *no month available.

Takagi et al., Quantum size effects on photoluminescence in ultrafine Si particles, Appl. Phys. Lett. Jun. 1990, 56(24), 2379–2380.

Baggott et al., The photodissociation of phenylsilane at 193 nm, Chem. Phys. Lett., Mar. 1986, 125, 22–26.

Castro and Ying, Synthesis and nitridation of nanocrystalline silicon produced via a tubular forced flow reactor, Mat. Sci. and Eng. 1995, A204, 65–70 *no month available.

Butler and Iachia, The Fundamental Basis for Cyclopolymerization. I . . . , J. Macromol. Sci.–Chem. Aug. 1969, A3(5), 803–819.

Butler et al., "The Fundamental Basis for Cyclopolymerization. I. Unconjugated Chromophoric Interactions Related to Cyclopolymerization", J. Macromo. Sci.–Chem., A3(5), pp. 803–819, Aug. 1969.

*Primary Examiner*—Kathryn L. Gorgos
*Assistant Examiner*—Edna Wong

[57] ABSTRACT

A method is described for the liquid phase synthesis of particles. The particles are composed of silicon or germanium and are optionally produced at sizes such that the particles exhibit quantum size effects. The particles are produced from an organometallic (tetra-organosilicon or tetra-organogermanium) precursors which is dissolved in a solvent that transmits a wavelength of light that photolyzes the precursor. The reaction is carried out under an inert atmosphere. A passivating agent is added to arrest particle growth and impart solubility to the particle. Optionally, a dopant is incorporated into the particle in the course of production so as to modify the electronic properties of the semiconductor particle.

20 Claims, 3 Drawing Sheets

METHOD FOR PHOTOLYTIC LIQUID PHASE SYNTHESIS OF SILICON AND GERMANIUM NANOCRYSTALLINE MATERIALS

FIELD OF THE INVENTION

The invention relates to novel dispersions of Group IV elements having nanocrystalline sized domains and a method for the liquid phase synthesis thereof.

BACKGROUND OF THE INVENTION

In recent years an increasing appreciation has developed for the ability to alter a wide variety of material properties simply by reducing the material domain size to such an extent that quantum (i.e. molecular or atomistic) effects are non-negligible. Semiconductor materials have generally been the subject of much of this investigation, particular attention has been paid to silicon. Silicon quantum size effects have been exploited to alter the bulk properties of: photoluminescence (H. Takagi, H. Ozawa, Y. Yamozaki, A. Ishizaki and T. Nagakiri, *Appl. Phys. Lett.* 56, 2379,(1991)); melting and sintering (A. N. Goldstein, *Appl. Phys.* A 62, 33 (1996); U.S. Pat. No. 5,576,248); band gap energy (S. Furakawa and T. Miyasato, *Superlattices and Microstructures* 5, 317(1989)); physical strength of derivative ceramics (D. T. Castro and J. H. Ying, *Matls. Sci. and Eng.* A204, 1995); and phosphorescence (U.S. Pat. No. 5,446,286 and U.S. Pat. No. 5,433,489). Owing to the broad range of uses of silicon in modern technology, modifications of its properties has far reaching consequences in industrial sectors including: electronics, aerospace, computers, energy and sensors. Efforts to extend the range of properties of silicon have lead by extension to the other Group IV materials germanium, and to a lesser extent tin. Germanium and tin are advantageous over comparable alternative materials because the well established processing techniques associated with silicon are amenable to use with these other Group IV elements.

Investigation of the quantum size effect in the Group IV elements silicon, germanium and tin have been hampered by the inability to produce macroscopic quantities of such particles. The desired samples consist of particles that are: monodisperse; of tunable domain size on the dimensional scale wherein quantum size effects are observed, typically from 1 to 20 nanometers; amenable to variations in the surface passivating functionalities, which serve to prevent agglomeration and formation of bulk domains; produced in macroscopic quantities; dispersible in a gaseous or liquid carrier, thereby facilitating isolated particle behavior; and amenable to doping with various ions and molecular dyes common to the art. In part due to the covalent, nonpolar nature of bonding between like atoms of Group IV elements, especially silicon, the metathesis reactions used to produce nanocrystals of Group II–VI semiconductors are disfavored. A nanocrystal is defined as a crystalline particle having cross sectional dimensions ranging from about 1 to 100 nanometers (hereafter nanometers are designated as "nm"). Metathesis reactions become increasingly difficult as the polarity of the resulting bond decreases. While Group II–VI nanocrystal materials such as CdS are readily produced from molecular precursors in an aqueous liquid phase solution ( M. L. Steigerwald et al., *J. Am. Chem. Soc.* 110, 3046 (1988); D. J. Norris, A. Scara, C. B. Murray, and M. G. Bawendi, *Phys. Rev. Let.* 72, 2612 (1994; H. J. Watzke and J. H. Fendler, *J. Phys. Chem.* 91, 6320 (1988)), the isoelectronic Group III–V nanocrystal, GaAs is produced only under air and water sensitive reaction conditions (M. A. Olshavsky, A. N. Goldstein and A. P. Alivisatos, *J. Am. Chem. Soc.* 112, 9438 (1990)). Since there is no analogous metathesis reaction for the Group IV elements silicon, germanium and tin, alternative particle synthesis techniques have been devised.

Polycrystalline silicon and nanocrystalline silicon have been produced by a variety of well known techniques such as evaporation (S. Ijima, Jap. *J. Appl. Phys.* 26, 357 (1987)), gas phase pyrolysis( K. A. Littau, P. J. Szajowski, A. J. Muller, A. R. Kortan, L. E. Brus, *J. Phys. Chem.* 97, 1224(1993)), gas phase photolysis (J. M. Jasinski and F. K. LeGoues, *Chem. Mater.* 3, 989 (1991);), electrochemical etching (V. Petrova-Koch et al., *Appl. Phys. Lett.* 61, 943 (1992)), plasma decomposition of silanes and polysilanes (H. Takagi et al, *Appl. Phys. Lett.* 56, 2379 (1990)), high pressure liquid phase reduction-oxidation reaction (J. R. Heath, *Science* 258, 1131 (1992))and most recently by refluxing the zintyl salt, KSi with excess silicon tetrachloride in a solvent of glyme, diglyme, or THF under nitrogen (R. A. Bley and S. M. Kauzlarich, *J. Am. Chem. Soc.,* 118, 12461 (1996)). While each of the above mentioned techniques satisfies some of the criteria desired for particle samples, none of these techniques is inclusive of all the desired properties.

Techniques for producing particles that are inclusive of all the desired properties are known to the art of producing metal colloids. Classical colloid chemistry teaches the that the addition of dispersants, passivating agents, and peptizing agents serve to stabilize the thermodynamically metastable colloidal domains. By way of example, such stabilizing agents have illustratively included soaps and detergents of fatty acids, resins, polyphosphates, organic polymers, chemically bonded small organic molecules of molecular weight less than about 500 and containing a nonfacile heteroatom such as O, N, S, P and the like, which serves to adsorb the molecule to the particle; clays and biopolymers such as albumin. Since metathesis reactions are disfavored for producing metal colloids for reasons similar to those for silicon, reduction-oxidation reactions are typically utilized to produce metal sols.

J. R. Thomas, U.S. Pat. No. 3,167,525 which is incorporated herein by reference, teaches electropositive metal dispersions stabilized by polymers are produced in liquid solution over a range of sizes and concentrations by decomposition of an organometallic precursor in which all bonds of the metal are to carbon. This method generally combines an alkylated or carbonylated metal with a class of stabilizing polymer in a hydrocarbon or ether solvent. The solution reaction is then initiated by exposure to heating, actinic or ultraviolet light.

Organosilanes have a well established chemistry as decomposition precursors to silicon. The gas-phase, ultraviolet (UV) photolysis the of organosilanes, tetraethyl- and tetravinyl-silane shows a stepwise elimination of 2-carbon aliphatics, resulting in the production of $SiH_4$, using the ArF laser line at 193 nm. Due to the low UV absorption cross section at 193 nm, silane is slow to decompose to silicon. J. Pola, J. P. Parsons and R. Taylor, *J. Orgmet. Chem.* 489, C9–C11(1995), which is incorporated herein by reference. Phenylsilanes are known to decompose under similar conditions by a two-channel process, yielding PhSiH+H and $SiH_2$+PhH. J. E. Baggott, H. M. Frey, P. D. Lightfoot and R. Walsh, *Chem. Phys. Lett.* 125, 22 (1986); which is incorporated herein by reference.

The UV absorption cross section of silanes and disilanes of the form $R_4Si$ and $R_6Si_2$, respectively, generally increases at longer wavelengths with increased molecular weight and increased bond delocalization. Silanes also show a shift to longer wavelengths in the absorption cross section upon dissolution in a solvent. The shift to longer wavelengths is more pronounced in a polar solvent, such as ethanol as compared to nonploar solvent such as isooctane. The "red" shift in absorption is associated with an increased stability. G. B. Butler and B. Iachia, *J. Macromol. Sci. Chem.*, A3(5) (1969) 803; which is incorporated herein by reference.

Organosilanes also form polysilanes under certain reaction conditions. Common reactions leading to polysilanes include condensation with alkali metals, dehydrogenative coupling in the presence of a suitable catalyst, and strained cyclosilane ring opening polymerization. A general discussion of polysilane chemistry is included in *Inorganic Polymers* by J. E. Mark, H. R. Allcock and R. West, Prentice Hall, Englewood Cliffs, N.J., 1992, Chapter 5; which is incorporated herein by reference. Polysilanes generally undergo chain scission upon exposure to ultraviolet light. Under exhaustive UV exposure disilane is a major scission product of polysilane reaction. However, aryl, and carbon-carbon double bond containing groups bound to the silicon atoms of a polysilane are known to undergo free radical cross-linking, as well as chain scission under UV exposure, thereby creating silicon atoms which are indirectly linked by means of the aliphatic units.

While the preceding discussion details the chemistry of organosilanes, analogous chemistries exist for organogermanium and organotin compounds. The photochemical decomposition of such organometallics are shown in the instant invention to be amenable to the production of particles of silicon, germanium and tin with properties heretofore unattainable. While the photolysis of the organometallics has often been carried out with UV photon sources, infrared multiphoton decomposition of tetra-ethylsilane, -germanium and -tin has been reported to initiate with the cleavage of the (Group IV element)-carbon bond, as reported by T. Majima, K. Nagahama, T. Ishii, *Reza Kagaku Kenkyu*, 9, 17 (1987).

Thus, it is an object of the present invention to produce novel forms of the individual Group IV elements silicon, germanium, and tin heretofore unattainable; wherein the domain size of the element is sufficiently small so as to show quantum size effects as evidenced by atomistic, non-bulk electronic or physical properties being evident in the particles as non-bulk: energy band gap, photoluminescence, or melting properties; the particle surface is chemically adjustable and both the average domain size and the size distribution are adjustable. It is a further goal of the invention to provide a generic synthesis process by which colloidal and or polyatomic forms of silicon, germanium and tin are produced in a liquid phase solvent under conditions of about Standard Pressure of one atmosphere and below.

SUMMARY OF THE INVENTION

According to the present invention the Group IV elements silicon and germanium form nanocrystalline particles of the separate elements, by the photolysis of organometallic precursors of the aforementioned elements in a solvent that further contains a passivating agent to stabilize the particles upon formation. Ultraviolet light is the preferred photolysis light source. The factors involved in selecting an organometallic percursor which is operative in the instant invention include: absorption cross section at the incident light source wavelength(s), solubility in the solvent, and chemical driving force for the removal of percursor organic fragments. Photolysis of the Group IV percursor of the instant invention in a suitable reaction vessel creates nanocrystalline domains of the Group IV element. An organometallic percursor of second element, which is not restricted to Group IV is optionally added to the reaction to create doped nanocrystals. These particles are also amenable to incorporation of dopant ions known to the art of bulk Group IV technology, in order to modify illustrativley the electronic, luminescent and physical properties of the nanocrystals. A passivating agent serves to keep the nanocrystal particles from aggregating and additionally to exert control over particle solubility and surface chemistry. The photolysis reactions described herein are generally performed under an inert atmosphere of about one atmosphere pressure or below.

The instant invention creates particles of silicon and germanium that are themselves novel. Particles are formed which have a size distribution of less than twenty percent of the particle diameter in the size regime wherein quantum size effects are observed. Quantum size effects are defined to include non-bulk: energy band gap, or photoluminescence or melting behavior observed in particles of a given size. The particles are optionally stable in solution phase and have a selectively controllable surface chemistry via the surface passivating agents employed. Furthermore, the resulting particles are generally free from reaction by-products.

BRIEF DESCRIPTIONS OF THE DRAWINGS

DETAILED DESCRIPTION OF THE INVENTION

The basis of the current invention is the identification of reagents and conditions for the photolytic formation of silicon, germanium or tin particles in a liquid solvent. While it is appreciated that the photonic reaction energy may be supplied from various portions of the light spectrum, it is a preferred embodiment that ultraviolet radiation be used, owing to several considerations including the photon energy, intensity and ease of use of commercially available UV lamps and lasers. In another embodiment of the invention, infrared energy is supplied to the reaction mixture. The following description of the invention will address reaction conditions using a UV photolysis source, but it is appreciated that one skilled in the art is capable of modifying the reaction cell, solvent, passivating agent and reagents to accommodate alternative portions of the electromagnetic spectrum as energy sources for the reaction and still be within the spirit of the invention.

Figure 1:
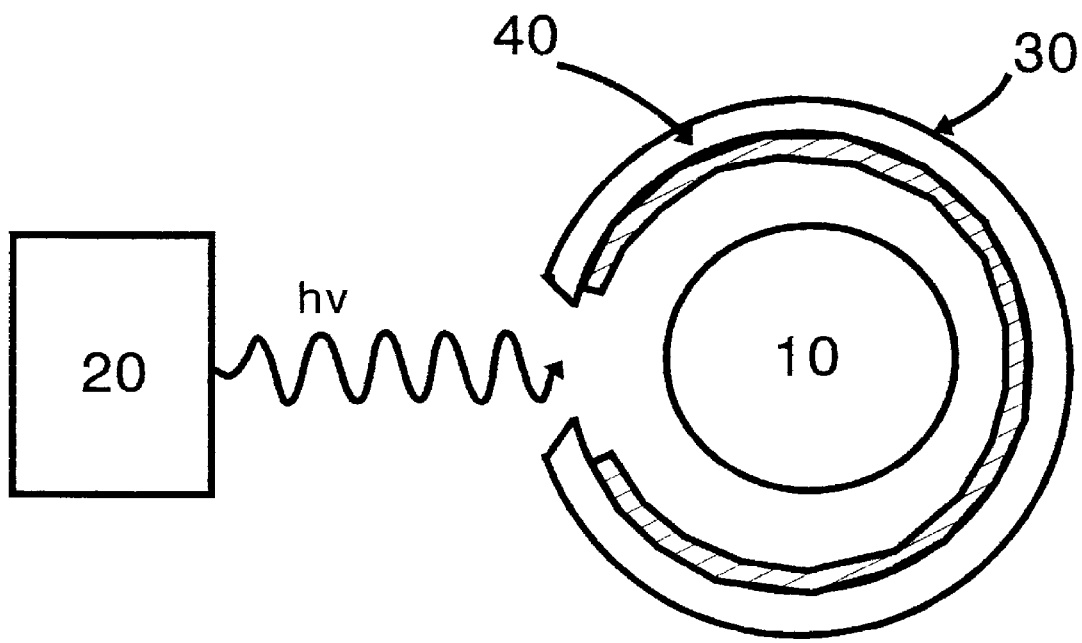
FIG. 1 is a schematic diagram of a an operative arrangement of reaction components in the instant invention.

FIG. 1 illustrates an operative arrangement of reaction components within the scope of the invention. A reaction vessel, 10 is placed in line to the photolysis light source, 20 such as a UV lamp or an excimer laser pulse beam. Due to the danger associated with exposure to high intensity UV light, the reaction vessel is placed within a containment shroud, 30. In the case wherein a UV lamp is present, the lamp is also within the enclosure (not shown). Preferably, the containment shroud interior is coated with a UV reflective coating, 40 to redirect transmitted and scattered UV light backthrough the reaction vessel, thereby increasing the probability of photon absorption by a reactant molecule within the reaction vessel. In the case of a UV lamp, a reflective coating also serves to partially offset the inverse distance squared drop off of intensity associated with radiative sources. The reflective coating is of a conventional type used with UV light such as polished metal structures or films of aluminum, stainless steel and the like.

The photolysis light source is any number of conventional light sources, the choice of a specific electric arc lamp or laser line is dictated by the absorption cross-section of the organometallic precursor. A quartz mercury vapor lamp while only radiating about 10 percent of its spectral output at wavelengths below 250 nm is often a satisfactory photolysis source owing to the high wattage of such lamps. Photolysis wavelengths between 180 nm and 250 nm are preferred for UV photolysis within the instant invention. Such lamps in providing a variety of radiative wavelengths may induce deleterious side reactions in the reaction mixtures of the present invention. Optionally, filters are introduced between the lamp and reaction vessel to limit the light wavelengths entering the reaction mixture. Filters invariably attenuate the desired wavelengths to some extent, thereby increasing reaction times. Excimer laser light sources, such as the ArF laser provide monochromatic light in high intensity to a small spatial area, thus precluding the need for filters. Regardless of the nature of the light source, relative transparency of the reaction vessel, solvent, and passivating agent; and a high absorption cross section by the organometallic precursor are determinative of the selection of each.

The reaction vessel containing the solvent, particle precursor and passivating agent is composed of a conventional material for UV transmittance, such as quartz glass. Preferably, the reaction vessel is composed of far UV quartz glass, which is defined as having greater than 70% transmittance to 200 nm incident light. Suitable reaction vessel materials are commercially available under a variety of brand names including SUPRASIL™. The reaction vessel is sealable by means of a stopper. Preferably, the reaction vessel has a stopcock and a ground glass fitting, thereby making the vessel adaptable to linkage to conventional air sensitive glassware, such as a Schlenk line. Such a fitting allows for the evacuation of the reaction vessel and or filling with various gaseous materials under controlled conditions. Optionally, the reaction vessel also has a fitting sealed by a septum, thereby allowing for aliquot removal of headspace gases or reaction mixture by means of a syringe or similar conventional transfer techniques. The reaction vessel is optionally in contact with a thermal source, such that the reaction mixture temperature is selectively increased or decreased relative to ambient temperature.

The UV photolysis solvent is principally unreactive under exposure to the incident light. This does not mean that the solvent always has a low absorption cross section relative to the incident light, since a solvent which acts as a photocatalyst is also operative. Whereas hydrocarbon solvents, such as hexanes have low absorption cross sections as UV solvents, conjugated multiple bonds systems in general, and aromatics in particular have higher cross sections than the hydrocarbons, but nonetheless serve as solvents under certain reaction conditions within the instant invention. Examples of the latter include benzene and toluene. A low absorption cross section is defined herein as being less than about one photon being absorbed per every 1,000,000 photons, on average at the selected wavelength to which the molecule is exposed. The choice of solvents for a particular reaction will become more apparent in regard to the examples which follow.

The solubility of the reactants and the passivating agent in the solvent must be sufficient for the reaction to proceed. Insufficient reactant concentrations causes particle growth to proceed at a rate that favors undesired side reactions. Reaction mixture concentrations are preferred to be greater than about $10^{-6}$ molar in the particle precursor molecule, greater than about $10^{-8}$ molar for polymeric passivating agents and greater than about $10^{-7}$ molar for passivating agents with a molecular weight of less than about 500 and a moiety suitable to absorb onto the particle surface. A broad range of reaction mixture concentrations offers some benefits in adding an additional parameter for the kinetic control of particle production.

Due to the tendencies of silicon, germanium and tin to oxidize, the reactions of the instant invention are carried out with the exclusion of air and water. Furthermore, in those reactions of the instant invention which use a UV excitation source, oxygen and water have complex photochemistries that may interfere with the production of particles. Thus, the reactions of the instant invention are conducted with solvents which have been dried and stored under an inert gas. Conventional means of drying solvents that are known in the art are operative herein.

The solvent boiling point is not a principal consideration in comparison to the aforementioned factors when selecting a solvent for UV photolysis as described in the current invention. However, infrared or thermal decomposition reaction of the instant invention often are accompanied by more than transitory elevated temperatures, relative to ambient room temperature. The infrared wavelength regime is defined herein to be between 750 nm and 1200 nm. In such instances a high boiling temperature, aprotic solvent is preferred. High boiling temperature is defined herein to be greater than about 110° C. Examples of such solvents illustratively include glymespyridine, nitrobenzene, formamide, N-methlyformamide, dimethlyformamide, N-methylacetamide, dimethylacetamide, dimethyl sulfoxide, sulfolane, ethylene carbonate, propylene carbonate, tributyl phosphates, hexamethylphosphoryltriamide, and the like.

In those instances wherein the precursor of the Group IV particle is a liquid in which the passivating agent is soluble, a neat reaction proceeds according to the instant invention. A neat reaction is defined as a reaction in which only substances catalyzing or being consumed by the reaction are present.

The headspace in the reaction vessel is maintained to promote the decomposition reaction and quell side reactions. In the preferred embodiment of a UV light source, the headspace is purged of oxygen and water vapor. This is accomplished by loading the reaction cell in a controlled atmosphere, such as a glove box, or alternatively by evacuating the reaction vessel and then transferring the reaction mixture thereto by means of a canula or other standard air sensitive handling techniques. A headspace pressure which is lower than that of the surrounding room atmosphere facilitates advancement of the reaction wherein the decomposition reaction liberates gaseous by products. The headspace volume is optionally filled with an inert gas illustratively including dinitrogen, argon, helium, and krypton. In still another embodiment, the headspace in addition to an inert gas, also contains a gas which either catalyzes the reaction or serves to passivate the particle surface. The best example of a gas capable of serving both these functions is dihydrogen wherein silicon particles are being formed. Other gases include deuterium, chlorine and gaseous monomers which polymerize in the course of the reaction to yield a stabilizing polymer such as alkenes, alkene oxides, alkynes and other hydrocarbon gaseous species containing a polymerizable multiple bond. Owing to the increasing chemical driving force for reaction in passing through the series silicon, germanium to tin, the need for such gaseous catalysts or passivating agents decreases.

A satisfactory passivating agent for use in the UV photolysis embodiment of the present invention exists in many forms. The passivating agent is required to be essentially unreactive under the reaction photolysis conditions and to yield the particle at suspendable in the reaction solvent, and preferably soluble. Representative passivating agents which are operative in the instant invention when soluble in the reaction solvent include: hydrogen, flourine, perfluoroalkene-, perfluoroalkene-sulfonic acid-, alkylene-methacrylic acid-, polyesters-polymers; nonionic surfactants; and small organic molecules of molecular weight less than about 500 and containing a nonfacile heteroatom moiety suitable to absorb onto the particle surface, the heteroatom illustratively being: fluorine, oxygen, nitrogen, sulfur, phosphorus, or the like. It is a preferred embodiment that the passivating agent be saturated in the case of surfactants and organic alcohols in order to prevent UV absorptions and reaction. It is appreciated that the polymeric passivating agents are modified and chain lengths increased by having a degree of saturation within the polymers or polymer precursors. While in situ control of polymer characteristics is desirable, the cost for such control is an increased reaction dynamic complexity. The more moieties within the passivating agent the more likely the occurrence of interacting with particle formation. Still a further class of passivating agents for producing particles of silicon, germanium or tin are unsymmetric organometallics. Unsymmetric is defined as wherein the organic adducts are not all identical about the Group IV central atom. Thus, a Group IV atom which does not readily undergo bond scission with at least one of its adducts, upon addition to a growing particle, truncates the growth phase of the particle at that surface site. Examples of suitable passivating organometallics include species of the formula $R_{4-n}(M_2)X_n$, wherein n is 1, 2 or 3; R is an aliphatic group containing less than 9 carbon atoms, X is hydrogen or fluorine, and $M_2$ is silicon, germanium or tin. It is appreciated that a variety of passivating agents not explicitly alluded to herein are operative within the present invention, since a molecule capable of absorption on the surface or otherwise isolating a growing particle is sufficient to stabilize the small domain sizes of Group IV elements silicon, germanium, and tin so desired.

Tetraorganometallics, wherein the metal is silicon and germanium, are the preferred precursors for the creation of particles of these elements. It is a more preferred embodiment, that the tetraorganometallics are symmetric organometallics. A symmetric organometallic is defined as one where all four groups bonded to the metal center are compositionally identical. In the most preferred embodiment, the organic groups bonded to the Group IV metal center are volatiles upon photolysis, meaning that organics are capable of leaving the reaction mixture in some from as gaseous species.

$(M_1)RR'R''R'''$ wherein R, R', R" and R'" are all the same or different, including hydrogen, alkyls containing less than 13 carbon atoms, monounsaturated alkenyls containing less than 9 carbon atoms, alkynyls containing less than 9 carbon atoms and aromatics containing less than 20 carbon atoms, and the like and $M_1$ is silicon or germanium or tin are operative as Group IV particle precursors. The choice of organometallic precursor is controlled not only by practical considerations such as cost and ease of synthesis of the precursor, but also the absorption cross section of the precursor at the incident photolysis wavelengths and the solubility in the solvent. In the case of liquid Group IV particle percursors, such as the tetravinyl-Group IV metals (i.e. tetravinylsilane) the passivating agent may be dissolved in the liquid precursor and the reaction run neat.

Figure 2:
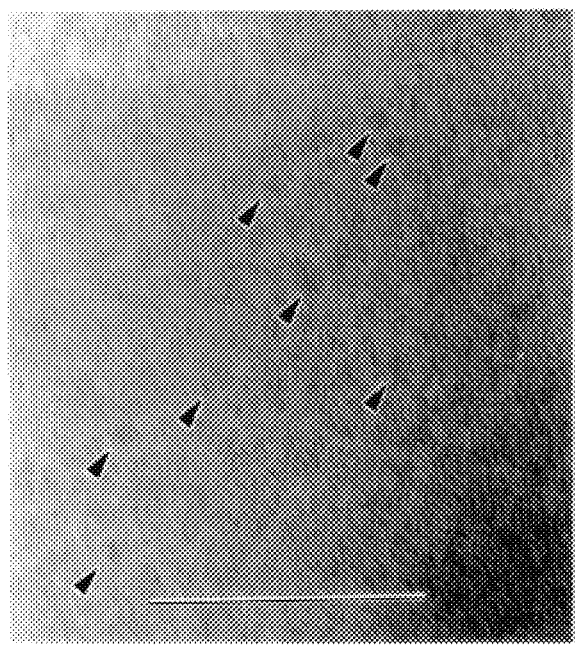
FIG. 2 is a transmission electron micrograph showing a field of silicon nanocrystals produced by the current invention, as described with reference to Example 1. The length bar represents 50 nanometers and the arrows point to individual particles contrasted against an amorphous carbon support film.

Many of the particles created in the instant invention are themselves novel and heretofore unattainable. Particles of silicon having a size distribution that varies by less than 20% of the particle diameter in the size regime wherein the quantum size effects are observed that are: stable in solution phase; have a selectively controllable surface chemistry; and generally free from reaction by-products, contaminating the resulting particles result from the organosilane percursor syntheses of the instant invention. The preferred particle sizes produced within the instant invention are less than 30 nm in diameter and are generally spherical in shape. A still more preferred average particle diameter within the instant invention is less than 6 nm. The silicon particles so synthesized are amenable to reduced temperature annealing as compared to bulk silicon, thereby improving the crystallinity of the nanocrystals and or modifying the particle surface properties. FIG. 2 shows a transmission electron micrograph of a field of particles so produced dipersed on an amorphous carbon film of about 60 nm thickness.

Particles of germanium having a size distribution that varies by less than 20% of the particle diameter in the size regime wherein quantum size effects are observed, that are stable in solution phase, have a selectively controllable surface chemistry and generally are free from reaction by-products contaminating the resulting particles result from the organogermanium percursor syntheses of the instant invention. The preferred particle sizes produced within the instant invention are less than 30 nm in diameter and are generally spherical in shape. A still more preferred average particle diameter within the instant invention is less than 8 nm. The germanium particles so synthesized are amenable to reduced temperature annealing as compared to bulk germanium, thereby improving the crystallinity of the nanocrystals.

The Group IV nanocrystals are also synthesized containing controlled quantities of dopants. The dopant precursors are preferably introduced to the reaction mixture in the form of organometallics. In a more preferred embodiment the organometallic dopant precursors are symmetric organometallics with properties similar to those detailed for the Group IV particle precursors. The dopant is any one of the conventional ions known to the art that modifies the electronic band gap, electroluminesence, photoluminesce, or fluorescence of bulk Group IV elements silicon, germanium and tin; illustratively, some of these include: lithium, beryllium, boron, nitrogen, sodium, magnesium, aluminum, phosphorus, titanium, vanadium, chromium, manganese, iron, cobalt, nickel, copper, zinc, gallium, arsenic, indium and antimony. It is appreciated that the photolysis reaction rate of the dopant is often not identical to that of the Group IV particle precursor. It is therefore optional that the dopant precursor be introduced to the reaction mixture during the growth phase of the silicon, germanium, or tin nanoparticles. Due to the more ionic nature of dopant ion-carbon bonds, many dopant organometallics have a greater decomposition reaction driving force, thereby making them often faster to react.

The instant invention is set forth above, is further described by the following examples to illustratively highlight some of its features. These examples are in no way intended to define the breadth or limits of the invention.

EXAMPLE 1

0.025 grams of tetraphenylsilane is placed in a far UV quartz cuvette under an atmosphere of dinitrogen. The cuvette is sealed and evacuated using a mechanical vacuum pump. About 3.0 milliliters of dry, distilled toluene is introduced to the cuvette. The reaction mixture is colorless. The cuvette is then placed in direct line with a 450 Watt water cooled mercury vapor arc lamp operating at 60 Hertz, 120 volts. The distal portion of the cuvette relative to the lamp is wrapped with reflective aluminum foil to increase light flux through the reaction mixture. The lamp and cuvette are placed within a light proof enclosure to prevent the escape of UV light into the surrounding environment. The lamp is then energized. After 90 minutes of UV light exposure, the reaction mixture is a pale yellow color with an absorption maximum at 330 nanometers and an absorption tail extending to beyond 500 nanometers. The resulting solution contains nanocrystals of silicon measuring about 4 nanometers in diameter based on electron micrographs.

Subsequent refluxing of the nanocrystal containing solution resulted in a gradual color change from pale yellow to bright yellow to orange to red. The color change is consistent with increasing domain size of silicon nanocrystals.

EXAMPLE 2

The experiment as described in Example 1 is repeated for 60 minutes UV exposure in hexane, resulting in a pale yellow solution. 0.05 grams of 2-butyl lithium in about one milliliter of dry, distilled hexane is added thereto. The lamp is energized for a further 30 minutes. The resulting solution has silicon nanocrystals and reflux behavior similar to that described in Example 1.

EXAMPLE 3

The experiment as described in Example 1 is repeated using hexane as a solvent and in later reactions with benzene as a solvent. Yielding equivalent silicon particles in similar reaction times. Subsequent refluxing of the nanocrystal containing solution resulted in a gradual color change from pale yellow to bright yellow to orange to red. The color change is consistent with increasing domain size of silicon nanocrystals.

EXAMPLE 4

Figure 3:
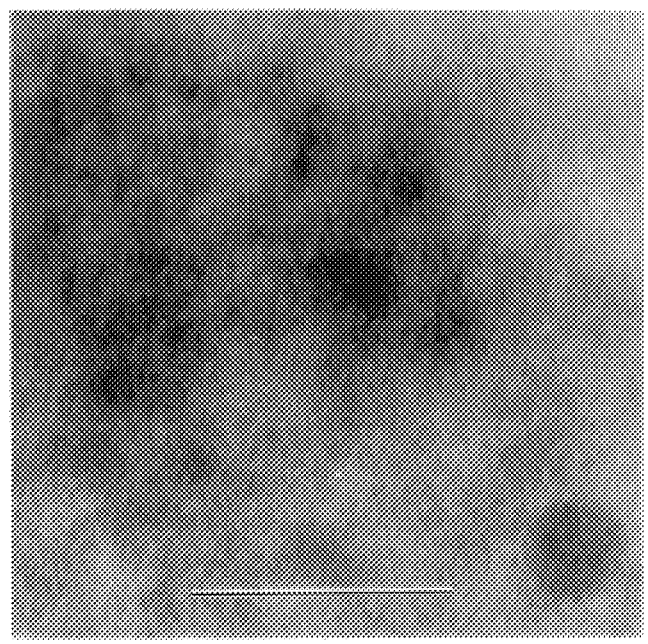
FIG. 3 is a transmission electron micrograph showing a field of silicon nanocrystals produced by the current invention, as described with reference to Example 4. The length bar represents 50 nanometers.

Tetravinylsilane is an air and moisture sensitive liquid compound. 0.3 milliliters of tetravinylsilane is placed in an evacuated far UV quartz cuvette and 2.4 milliliters of distilled, dry hexanes is added. The cuvette is irradiated with UV light as described in Example 1. After 150 minutes of UV light exposure a slight coloration to the solution appeared, as confirmed by variations in the absorption spectrum of the reaction mixture in the cuvette. Upon subsequent refluxing a black precipitate of aggregated particles of silicon resulted. FIG. 3 shows a transmission electron micrograph of a field of particles so produced dipersed on an amorphous carbon film of about 60 nm thickness.

EXAMPLE 5

The reaction of Example 3 is conducted with the addition of 0.10 grams of N-vinylpyrrolidone polymer and the substitution of a 1200 Watt UV lamp for that of the 450 Watt lamp. Upon exposure to UV light about 5 nanometer particles of silicon resulted which are stable in solution for more than one month.

EXAMPLE 6

Tetraethylsilane is a moisture sensitive liquid and as such is stored in a glovebox under a dry, dinitrogen atmosphere. A weighed, far UV quartz Schlenk flask is loaded within the glovebox, with 0.0035 mols of tetrethylsilane, and 0.015 grams of poly(butylmethacrylate) of an average molecular weight of about 330 kiloDaltons. The flask is then sealed and brought into room air. 50 grams of hexane is then added the flask. The hexane is dried over benzophenone and sodium metal prior to introduction to the flask. Upon dissolution of the poly(butylmethacrylate) in hexane the flask is placed adjacent to a 450 W water cooled mercury arc lamp operating at 60 Hertz, 120 volts. The distal portion of the flask relative to the lamp is wrapped with reflective aluminum foil to increase light flux through the reaction mixture. The lamp and flask are placed within a light proof enclosure to prevent the escape of UV light into the surrounding environment. The lamp is then energized. Aliquots of the reaction mixture are withdrawn at regular time intervals and placed in a cuvette. The cuvette UV-visible light absorption spectrum is recorded and a droplet of the reaction mixture is placed on a transmission electron microscopy grid for subsequent real space imaging and electron diffraction study. The reaction mixture initially is a colorless solution with an absorption maximum at 332 nanometers. After one hour of exposure to the lamp, a tail in the absorption spectrum is observed to extend just beyond 500 nanometers and the absorption maximum is observed at 386 nanometers. A pale yellow color is observed to the reaction mixture.

EXAMPLE 7

0.2 grams of tetrethlygermanium is placed in an evacuated far UV quartz cuvette, to which 3 milliliters of dry, distilled hexane is added, along with 0.05 grams of poly (butylmethacrylate) having an average molecular weight of 330 kiloDaltons. Upon reaction as per Example 1, nanocrystals of germanium are produced on the order of 6 nanometers in diameter. The reaction is repeated in toluene as the solvent to give a similar result.

EXAMPLE 8

0.3 grams of tetrabutyltin is substituted for tetraethlygermanium of Example 6. The reaction is conducted as per Example 1, resulting in nanocrystals of tin on the order of 6 nanometers in diameter.

What is claimed is:

1. A method for producing silicon or germanium particles, said method comprising:

sealing an organometallic precursor of the formula, ($M_1$) RR'R"R"', wherein R, R', R", and R'" are each independently selected from the group consisting of hydrogen, alkyls containing less than 13 carbon atoms, monounsaturated alkenyls containing less than 9 carbon atoms, alkynyls containing less than 9 carbon atoms and aromatics containing less than 20 carbon atoms, and $M_1$ is selected from the group consisting of silicon and germanium under an inert atmosphere within a reaction vessel transmissive to a photolysis wavelength;

adding a liquid solvent transmissive to said photolysis wavelength to said reaction vessel, said solvent having a molecular structure, the structure being free of oxygen; and exposing said reaction vessel to a light source, wherein said light source produces sufficient flux of said photolysis wavelength to photolyze said precursor within said reaction vessel to form a $M_1$—$M_1$ bond; and maintaining a kinetically stable population of $M_1$-comprising radicals with the light source flux, said population reacting with said $M_3$—$M_1$ bond to form one of said particles.

2. The method of claim 1 further comprising the step of adding a passivating agent to arrest changes in particle diameter of said particles.

3. The method of claim 2 wherein the passivating agent is selected from the group consisting of: perfluoroalkene-, perfluoroalkene-sulfonic acid-, alkylene-methacrylic acid-, polyesters-polymers; nonionic surfactants; organometallic species of the formula $R_{4-n}(M_2)X_n$, wherein n is 1, 2 or 3; R is an aliphatic group containing less than 9 carbon atoms, X is hydrogen or fluorine, and $M_2$ is silicon or germanium; and small organic molecules of molecular weight less than about 500 and containing a nonfacile heteroatom of oxygen, nitrogen, sulfur, or phosphorus.

4. The method of claim 1 wherein said photolysis wavelength is between about 180 nanometers and 250 nanometers.

5. The method of claim 1 wherein said photolysis wavelength is between about 750 nanometers and 1200 nanometers.

6. The method of claim 1 wherein said organometallic precursor is symmetric, such that R, R', R", and R''' are all compositionally identical.

7. The method of claim 1 wherein said organometallic precursor yields volatile organic fragments upon photolysis.

8. The method of claim 1 further comprising the step of:
adding a dopant precursor having a dopant atom therein to said reaction vessel such that the dopant atom is incorporated into said particles.

9. The method of claim 8 wherein said dopant precursor is an organometallic precursor.

10. The method of claim 1 wherein said inert atmosphere has a pressure of one atmosphere or less.

11. The method of claim 1 wherein said particles exhibit quantum confinement effects.

12. A method for producing silicon or germanium particles, said method comprising:

sealing an organometallic precursor of the formula, $(M_2)$ RR'R"R''', wherein R, R', R", and R'''are each independently selected from the group consisting of hydrogen, alkyls containing less than 13 carbon atoms, monounsaturated alkenyls containing less than 9 carbon atoms, alkynyls containing less than 9 carbon atoms and aromatics containing less than 20 carbon atoms, and $M_1$ is selected from the group consisting of silicon and germanium under an inert atmosphere within a reaction vessel transmissive to a photolysis wavelength;

adding a liquid solvent transmissive to said photolysis wavelength to said reaction vessel;

exposing said reaction vessel to a light source that produces said photolysis wavelength to yield said particles; and adding a dopant precursor having a dopant atom therein to said reaction vessel such that the dopant atom is incorporated into said particles.

13. The method of claim 12 wherein the dopant atom is selected from the group consisting of: lithium, beryllium, boron, nitrogen, sodium, magnesium, aluminum, phosphorus, titanium, vanadium, chromium, manganese, iron, cobalt, nickel, copper, zinc, gallium, arsenic, indium and antimony.

14. The method of claim 12 wherein said particles exhibit quantum confinement effects.

15. The method of claim 12 further comprising:
adding a passivating agent to arrest changes in particle diameter of said particles.

16. A method for producing silicon or germanium particles, said method comprising:

sealing an organometallic precursor of the formula, $(M_1)$ RR'R"R''', wherein R, R', R", and R''' are each independently selected from the group consisting of hydrogen, alkyls containing less than 13 carbon atoms, monounsaturated alkenyls containing less than 9 carbon atoms, alkynyls containing less than 9 carbon atoms and aromatics containing less than 20 carbon atoms, and $M_1$ is selected from the group consisting of silicon and germanium under an inert atmosphere of about one atmosphere or less, within a reaction vessel capable of transmitting a photolysis wavelength;

adding a liquid solvent capable of transmitting said photolysis wavelength to said reaction vessel;

exposing said reaction vessel to a light source that produces said photolysis wavelength; and adding a passivating agent to arrest changes in particle diameter of said particles.

17. The method of claim 16 wherein said particles exhibit quantum confinement effects.

18. The method of claim 16 wherein said photolysis wavelength is between about 180 nanometers and 250 nanometers.

19. The method of claim 16 wherein said organometallic precursor yields volatile organic fragments upon photolysis.

20. The method of claim 16 wherein the passivating agent is selected from the group consisting of: perfluoroalkene-, perfluoroalkene-sulfonic acid-, alkylene-methacrylic acid-, polyesters-polymers; nonionic surfactants; organometallics species of the formula $R_{4-n}(M_2)X_n$, wherein n is 1, 2 or 3; R is an aliphatic group containing less than 9 carbon atoms, X is hydrogen or fluorine, and $M_2$ is silicon or germanium; and small organic molecules of molecular weight less than about 500 and containing a nonfacile heteroatom of oxygen, nitrogen, sulfur,or phosphorus.

* * * * *